(12) United States Patent
Angarola et al.

(10) Patent No.: US 6,173,747 B1
(45) Date of Patent: *Jan. 16, 2001

(54) TENSIONING TOOL WITH BIASED COLLAR VALVE ACTUATOR AND METHOD THEREFOR

(75) Inventors: Barry R. Angarola, Schaumburg; Janusz Figiel, Mount Prospect, both of IL (US)

(73) Assignee: Illinois Tool Works Inc., Glenview, IL (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/275,928

(22) Filed: Mar. 24, 1999

(51) Int. Cl.[7] .......................................... B21F 9/00

(52) U.S. Cl. ............................ 140/93.2; 251/263

(58) Field of Search .............. 173/169; 251/262, 251/263; 140/93.2, 93.4; 403/111

(56) References Cited

U.S. PATENT DOCUMENTS

| 1,574,768 | * | 3/1926 | Tuttle ................................... 251/263 |
| 2,075,720 | * | 3/1937 | Hoffmann ............................ 140/93.4 |
| 3,028,885 |   | 4/1962 | Leslie et al. . |
| 3,083,944 | * | 4/1963 | Doeden . |
| 3,149,511 | * | 9/1964 | Warren ................................... 72/121 |
| 3,249,131 |   | 5/1966 | Lingle . |
| 3,309,061 | * | 3/1967 | Plattner ............................... 140/93.2 |

FOREIGN PATENT DOCUMENTS

0593261 * 4/1994 (EP) .

* cited by examiner

Primary Examiner—Lowell A. Larson
(74) Attorney, Agent, or Firm—Mark W. Croll; Donald J. Breh; John P. O'Brien

(57) ABSTRACT

A collar actuatable air valve for air powered strap tensioning tools, and methods therefor, including a collar rotatably coupled to a housing, an air valve disposed at least partially in the housing and having an actuator portion biased to protrude therefrom and into engagement with an actuator surface of the collar. A collar biasing member rotatably biases the collar relative to the housing to close the air valve, whereby the collar is rotatable against the bias of the collar biasing member to open the air valve.

22 Claims, 2 Drawing Sheets

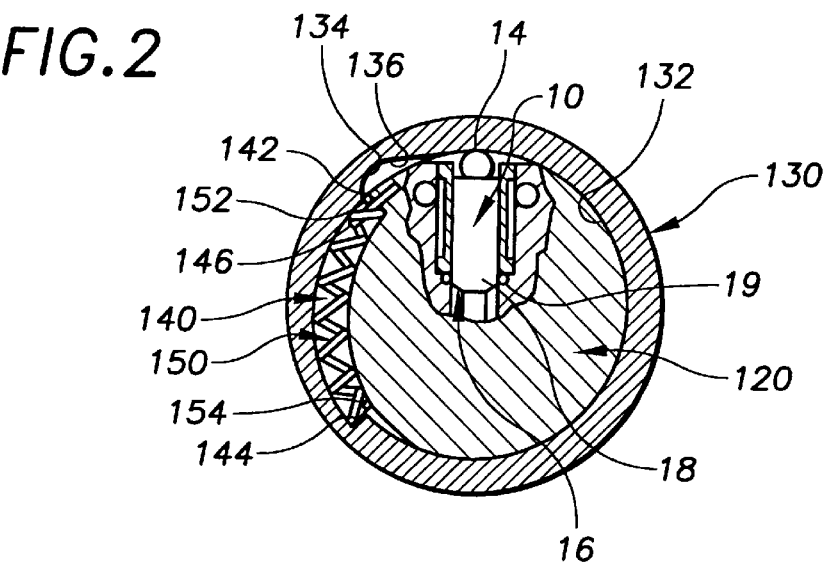
FIG. 2
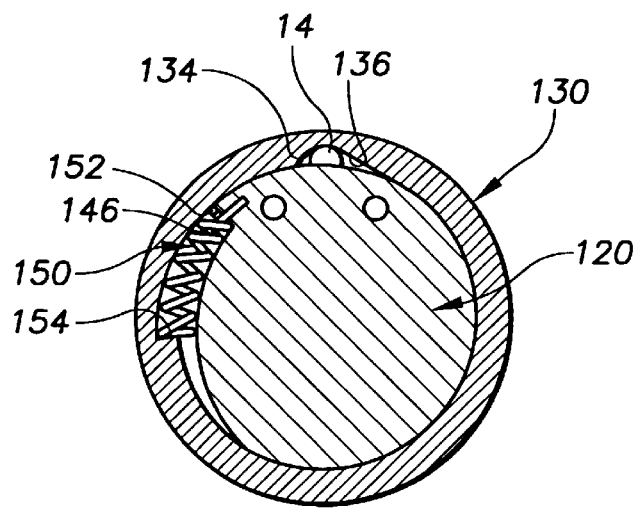
FIG. 3
FIG. 4
PRIOR ART
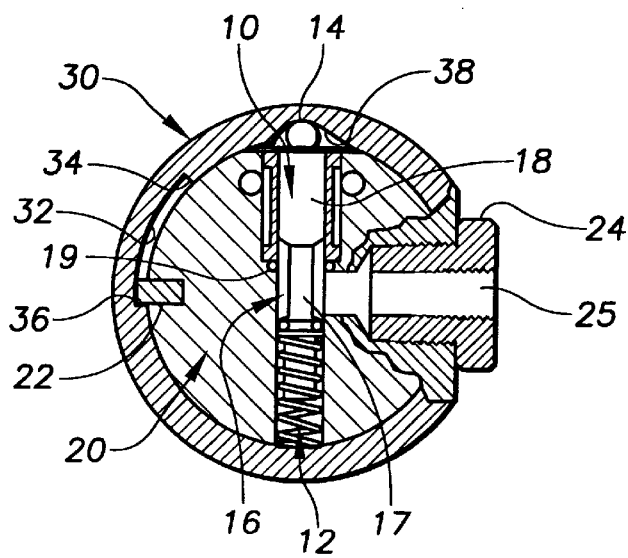

TENSIONING TOOL WITH BIASED COLLAR VALVE ACTUATOR AND METHOD THEREFOR

BACKGROUND OF THE INVENTION

The invention relates generally to powered tensioning tools, and more particularly to powered tensioning tools having collar actuated air valves and methods therefor.

Powered tensioning tools are known generally and used widely to tension strap about a load. These tools comprise generally a feed wheel protruding from a gear housing of the tool for engaging and tensioning strap disposed between the feed wheel and a base plate, or foot, of the tool. The feed wheel is driven generally by an air motor disposed in a drive housing coupled to the gear housing, and a pneumatic valve controls the supply of compressed air to the air motor from an air line coupled to the drive housing.

In some tensioning tools, disclosed for example in U.S. Pat. No. 3,028,885 entitled "Power Strap Tensioning Tool", the pneumatic valve is actuated by depressing a button operated switch protruding from the drive housing. In other tensioning tools, disclosed for example in U.S. Pat. No. 3,249,131 entitled "Power Strap Tensioning Tool", the air motor is operated with a ring, or collar, valve actuator rotatably disposed about the drive housing. The collar valve actuator is generally rotatable back and forth over a small angular interval to open and close the pneumatic valve, and thus to control the air motor.

Prior art FIG. 4 of the present patent application illustrates more particularly the actuation of a pneumatic, or air, valve 10 in a housing 20 of a strap tensioning tool by a collar 30 rotatably coupled thereto. The collar 30 is rotatable relative to the housing 20 back and forth over some angular interval, which is limited by a pin 22 protruding radially from the housing 20 into a recess 32 of the collar. The pin 22 is engageable with stops 34 and 36 on opposing ends of the recess 32 upon rotation of the collar 30. The valve 10 includes a valve stem 16 biased by a spring 12 so that an actuator portion 14 thereof is biased to protrude from the housing 20 and into engagement with an inner portion of the collar 30. In a first position of the collar 30, illustrated in FIG. 4, the spring 12 biases the valve stem 16 into a tapered recess 38 of the collar 30 to open the supply of compressed air from an air line fitting 24 on the housing 20 to the air motor. When the collar 30 is rotated counter-clockwise relative to the housing 20, the tapered recess 38 thereof engages and depresses the actuator portion 14 of the valve stem against the bias of the spring 12 to close the supply of compressed air at the o-ring seal 19. The collar of known tensioning tools however must be rotated manually relative to the housing to actuate the valve that opens and closes the supply of compressed air.

The present invention is drawn toward advancements in the art of collar actuated valve assemblies useable in powered tensioning tools.

An object of the invention is to provide novel collar actuated valve assemblies for powered tensioning tools and combinations thereof that overcome problems in the art.

Another object of the invention is to provide novel collar actuated valve assemblies for powered tensioning tools and combinations thereof that are biased in a position that terminates the supply of air to an air motor of the tool.

A more particular object of the invention is to provide novel collar actuatable air valves useable in air powered strap tensioning tools, and combinations thereof, comprising generally a collar rotatably coupled to a housing, and an air valve disposed at least partially in the housing and having an actuator portion biased to protrude therefrom and into engagement with an actuator surface of the collar. A collar biasing member rotatably biases the collar to close the air valve, whereby the collar is rotatable against the bias of the collar biasing member to open the air valve.

Another more particular object of the invention is to provide novel methods for operating air powered strap tensioning tools comprising generally supplying air to an air valve disposed at least partially in a housing of the tool, biasing an actuator portion of the air valve to protrude from the housing and into engagement with a collar rotatably coupled to the housing, and rotatably biasing the collar to close the air valve, whereby the collar is rotatable manually against the bias to open the air valve.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2 is a partial sectional view along lines b—b of FIG. 1 illustrating the collar of the tool rotatably biased to close the valve.

FIG. 3 is a partial sectional view along lines b—b of FIG. 1 illustrating the collar of the tool rotated against a bias to open the valve.

FIG. 4 is a partial sectional view along lines a—a of FIG. 1 illustrating a prior art collar actuatable valve in a tensioning tool.

DETAILED DESCRIPTION OF THE INVENTION

Figure 1:
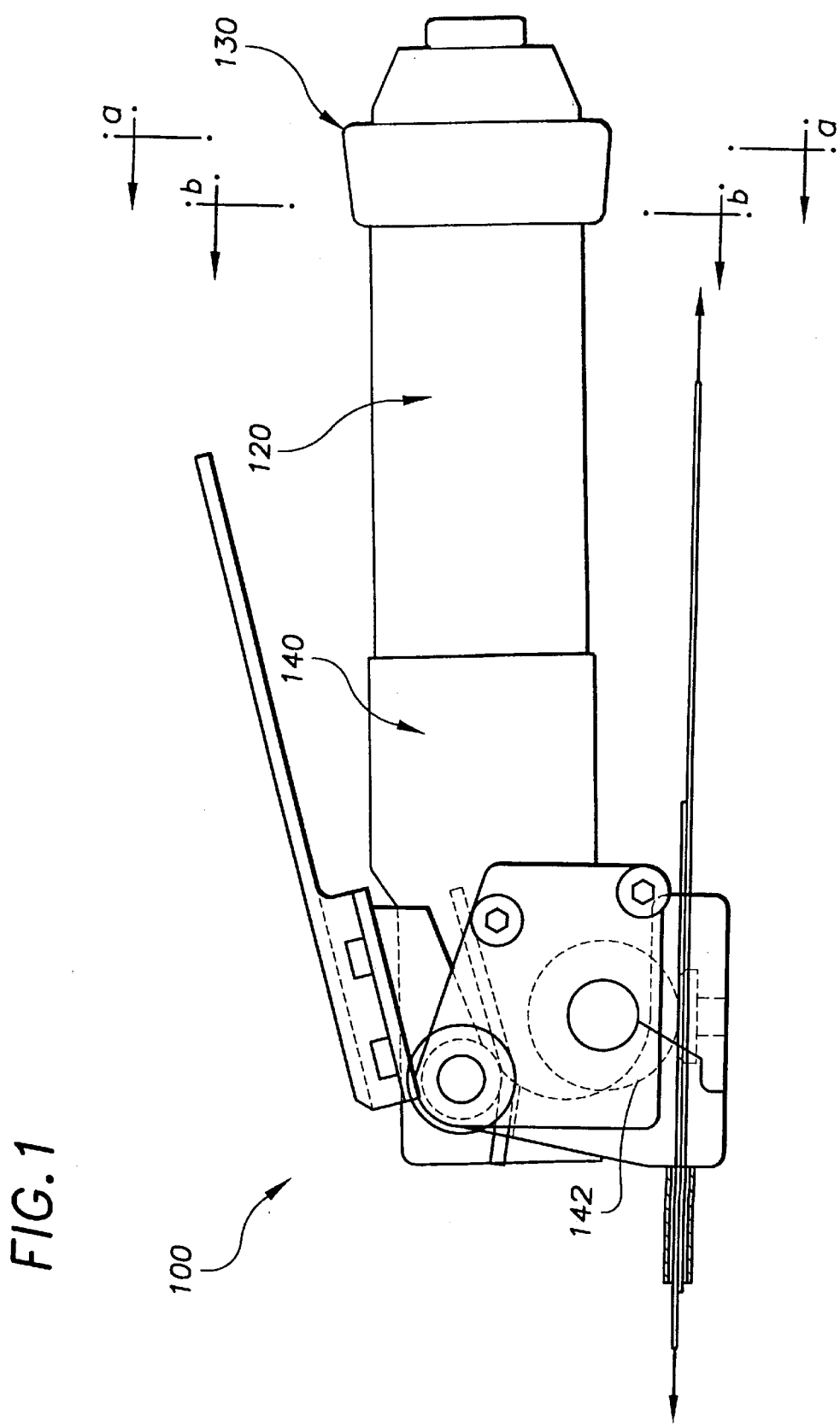
FIG. 1 is a side view of a powered strap tensioning tool having a collar actuatable valve.

FIG. 1 is a strap tensioning tool 100 comprising generally a drive housing, or merely a housing 120 with a collar 130 rotatably coupled thereto for actuating an air valve that supplies compressed air to an air motor, not shown but known generally. The housing 120 and air motor therein are coupled to a gear housing 140 of the tool 100 for driving a feed wheel 142 protruding therefrom that engages and tensions strap, as is known generally.

The exemplary tensioning tool 100 is a strap on strap type tensioning tool, but the invention is applicable more generally to any air powered strap tensioning tool, including push type tensioning tools, having a collar rotatably coupled to a housing for actuating an air valve that supplies compressed air. The present invention is applicable still more generally to any collar actuatable air valve assembly.

FIG. 2 illustrates the collar 130, which is rotatably coupled to the housing 120, having an inner portion 132 defining an actuator surface thereof, the operation of which is discussed more fully below. FIG. 2 also illustrates an air valve 10 disposed at least partially in the housing 120. The air valve 10 includes an actuator portion 14 biased to protrude from the housing 120 and into engagement with the actuator surface of the collar 130 to open and close the air valve 10 upon rotation of the collar 130 relative to the housing 120.

The collar 130 is rotatable relative to the housing 120 and generally about an axial dimension thereof over a small angular range in clockwise and counter-clockwise directions between first and second positions. The actuator surface of the collar 130 is located on the inner portion 132 of the collar and is configured to cooperate with the actuator portion 14 of the air valve 10 so that the air valve is opened when the collar is rotated to the first position, and so that the air valve is closed when the collar is rotated to the second position.

In the exemplary embodiment of FIG. 2, the actuator surface of the collar 130 includes a collar recess 134 and a tapered portion 136. When the collar 130 is rotated in the clockwise direction from the second position illustrated in FIG. 2 to the first position illustrated in FIG. 3, the actuator portion 14 of the air valve is allowed to protrude into the recess 134 of the collar 130 to open the air valve 10, as is known generally. When the collar is rotated in the counter-clockwise direction from the first position illustrated in FIG. 3 to the second position illustrated in FIG. 2, the tapered portion 136 of the actuator surface engages and depresses the actuator portion 14 of the air valve 10 against its bias to close the air valve.

The cooperative interaction between the actuator surface of the collar 130 and the actuator portion 14 of the air valve 10 to open and close the air valve discussed immediately above is known generally and is illustrated also in FIG. 4. FIG. 4 further illustrates the actuator portion 14 of the air valve 10 disposed on a valve stem 16 thereof, which is biased by a spring member 12 so that the actuator portion 14 thereof protrudes from the housing as discussed above. In FIG. 4, a narrowed portion 17 of the valve stem allows air to flow from an air inlet passage 25 of the air line fitting 24 to the air motor when the actuator portion 14 of the air valve 10 is biased to protrude sufficiently from the housing, as is known generally. In FIG. 2, a widened portion 18 of the valve stem 16 engages a seal 19 to block the flow of air from the air line fitting when the actuator portion 14 of the air valve 10 is engaged and depressed by the actuator surface of the collar 130, as is known generally.

According to the present invention, generally, a collar biasing member is disposed between the collar 130 and the housing 120 to bias the collar to the second position in which the air valve 10 is closed. The collar 130 is however rotatable against the bias of the collar biasing member to the first position to open the air valve 10. This aspect of the invention may be viewed as a safety feature that requires an operator of the tool to maintain a grip on the collar rotatably positioned against the bias of the biasing member in order to open the valve 10 and maintain the supply of compressed air for the operation thereof.

In the exemplary embodiment of FIG. 2, the collar biasing member is generally a compressed resilient member disposed in a biasing member recess 140 formed partially in the drive housing 120, forming a housing engagement surface 142 therein. The biasing member recess 140 is also formed partially in the collar 130, forming a collar engagement surface 144 therein. The housing engagement surface 142 and the collar engagement surface 144 are disposed generally radially relative to the housing 120 so that the collar biasing member may be retained and compressed therebetween. A first portion of the compressed collar biasing member is thus engaged with the housing engagement surface 142 and a second portion of the compressed collar biasing member is engaged with the collar engagement surface 144 to rotatably bias the collar 130 to the second position where the air valve is closed, as illustrated in FIG. 2.

In the exemplary embodiment of FIG. 2, the collar biasing member is a compression coil spring 150 having a first end portion 152 engaged with the housing engagement surface 142 and an opposing second end portion 154 engaged with the collar engagement surface 144 to compress the spring 150 therebetween. The compression coil spring 150 is under compression so that the collar 130 is rotatably biased to the second position illustrated in FIG. 2 to close the air valve 10.

In FIGS. 2 and 3, the housing engagement surface preferably includes a pin 146 protruding therefrom, and the first end portion 152 of the compression coil spring 150 is disposed about the pin 146 to facilitate insertion of the compression coil spring 150 in the biasing member recess 140 during assembly of the tool.

In an alternative embodiment, the collar biasing member is a resilient material, formed for example of a urethane or some other suitable material, having a first end portion and an opposing second end portion. A first end portion of the resilient material is engaged with the housing engagement surface and a second end portion of the resilient material is engaged with the collar engagement surface to compress the resilient member therebetween. The compressed resilient material thus biases the collar to the second position where the air valve is closed, whereby the collar is rotatable against the bias thereof to open the air valve, as discussed above in connection with the compressed spring member.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A strap tensioning tool comprising:

a housing for an air motor;

a collar disposed about and rotatably coupled to the housing, the collar having an inner portion defining an actuator surface, an air valve disposed at least partially in the housing, the air valve having an actuator portion to open and close the air valve, the actuator portion biased to protrude from the housing and into engagement with the actuator surface of the collar, the collar rotatable relative to the housing between a first position where the air valve is opened and a second position where the air valve is closed;

a compressed collar biasing member disposed between a circumferential portion of the housing and the collar, the compressed collar biasing member transverse to a rotation axis of the collar, the compressed collar biasing member having a first portion engaged with the housing and a second portion engaged with the collar, the compressed collar biasing member biasing the collar to the second position where the air valve is closed, whereby the collar is rotatable to the first position against the bias of the compressed collar biasing member to open the air valve.

2. The tool of claim 1 further comprising a biasing member recess disposed between a circumferential portion of the housing and the collar, the biasing member recess formed partially in the housing and forming a housing engagement surface therein, the biasing member recess formed partially in the collar and forming a collar engagement surface therein, the compressed collar biasing member is disposed in the biasing member recess, the first portion of the compressed collar biasing member is engaged with the housing engagement surface and the second portion of the compressed collar biasing member is engaged with the collar engagement surface.

3. The tool of claim 2, the compressed collar biasing member is a compression coil spring having a spring axis disposed circumferentially between the housing and the collar, the compression coil spring having a first end portion and an opposing second end portion, the first end portion of the compression coil spring is engaged with the housing engagement surface, and the second end portion of the compression coil spring is engaged with the collar engagement surface.

4. The tool of claim 3, the housing engagement surface of the biasing member recess includes a pin protruding therefrom, the first end portion of the compression coil spring is disposed about the pin.

5. The tool of claim 2, the housing engagement surface and the collar engagement surface are disposed generally radially relative to the housing to compressibly retain the compressed collar biasing member therebetween.

6. The tool of claim 2, the compressed collar biasing member is a resilient material having a first end portion and an opposing second end portion, the first end portion of the resilient material is engaged with the housing engagement surface, and the second end portion of the resilient material is engaged with the collar engagement surface.

7. The tool of claim 1, the actuator surface of the collar includes a collar recess with a tapered portion, the actuator portion of the air valve is biased to protrude into the collar recess when the collar is rotated to the first position to open the air valve, and the tapered portion of the actuator surface is engageable with the actuator portion of the air valve when the collar is rotated to the second position to close the air valve.

8. The tool of claim 1, the actuator portion of the air valve is disposed on a valve stem of the air valve, the valve stem is biased with a spring member so that the actuator portion of the air valve protrudes from the housing.

9. A collar actuatable air valve in an air powered strap tensioning tool, comprising:
    a collar disposed about and rotatably coupled to a housing of the tool, the collar having an actuator surface,
    an air valve disposed at least partially in the housing, the air valve having an actuator portion protruding from the housing into engagement with the actuator surface of the collar,
    the collar rotatable relative to the housing between first and second positions;
    a compressed coil spring disposed circumferentially between the housing and the collar, a spring axis of the compressed coil spring substantially transverse to a rotation axis of the collar, the compressed coil spring having a first end portion engaged with the housing and a second end portion engaged with the collar.

10. The collar actuatable air valve of claim 9 further comprising a spring recess formed partially in the housing and forming a housing engagement surface therein, the spring recess formed partially in the collar and forming a collar engagement surface therein, the compressed coil spring is disposed in the spring recess, the first end portion of the compressed coil spring is engaged with the housing engagement surface and the second end portion of the compressed coil spring is engaged with the collar engagement surface.

11. The collar actuatable air valve of claim 10, the housing engagement surface of the biasing member recess includes a pin protruding therefrom, the first end portion of the compressed coil spring is disposed about the pin.

12. The collar actuatable air valve of claim 10, the housing engagement surface and the collar engagement surface are disposed generally radially relative to the housing to compressibly retain the compressed coil spring therebetween.

13. The collar actuatable air valve of claim 9, the actuator surface of the collar includes a collar recess with a tapered portion, the actuator portion of the air valve is biased to protrude into the collar recess when the collar is rotated to the first position to open the air valve, and the tapered portion of the actuator surface is engageable with the actuator portion of the air valve when the collar is rotated to the second position to close the air valve.

14. The collar actuatable air valve of claim 9, the actuator portion of the air valve is disposed on a valve stem of the air valve, the valve stem is biased with a spring member so that the actuator portion of the air valve protrudes from the housing.

15. A method for operating an air powered strap tensioning tool, comprising:
    supplying air to an air valve disposed at least partially in a housing of the tool;
    biasing an actuator portion of the air valve to protrude from the housing and into engagement with a collar disposed about and rotatably coupled to the housing,
    the collar rotatable relative to the housing between first and second positions;
    biasing the collar to one of the first and second positions with a compressed resilient member disposed circumferentially between the housing and the collar member transverse to a rotation axis of the collar,
    whereby the collar is rotatable to the other of the second and first positions against the bias of the compressed resilient member.

16. The method of claim 15, the compressed resilient member disposed in a circumferential recess between the collar and the housing, biasing the collar with a first end portion of the compressed resilient member acting against a radial portion of the housing and a second end portion of the compressed resilient member acting against a radial portion of the collar.

17. The method of claim 15, biasing the actuator portion of the air valve to protrude from the housing and into a collar recess of the collar when the collar is rotated to the first position to open the air valve, and engaging the actuator portion of the air valve with a tapered portion of the collar when the collar is rotated to the second position to close the air valve.

18. The method of claim 15, the actuator portion of the air valve is disposed on a valve stem of the air valve, biasing the actuator portion of the air valve to protrude from the housing with a spring member coupled to the valve stem.

19. A strap tensioning tool comprising:
    a motor housing;
    a motor actuating collar disposed about and rotatably coupled to the housing, the collar rotatable relative to the housing between first and second positions;
    a coil spring disposed circumferentially between the housing and the collar, a spring axis of the coil spring substantially transverse to a rotation axis of the collar,
    the coil spring having a first end portion engaged with the housing and a second end portion engaged with the collar,
    whereby the coil spring biases the collar to one of the first or second positions.

20. The tool of claim 19, a first coil spring recess with a housing engagement surface formed in the housing, a second coil spring recess with a collar engagement surface formed in the collar, the first end portion of the coil spring disposed in the first coil spring recess and engaged with the housing engagement surface thereof, the second end portion of the coil spring disposed in the second coil spring recess and engaged with the collar engagement surface thereof.

21. The tool of claim 20, the housing engagement surface and the collar engagement surface disposed generally radially relative to the housing, the coil spring disposed therebetween.

22. The tool of claim 19, a motor actuator disposed at least partially in the housing, a portion of the motor actuator protruding from the housing and into engagement with an actuator portion on an inner surface of the collar.

* * * * *